United States Patent Office 3,499,855
Patented Mar. 10, 1970

3,499,855
WATER-SOLUBLE POLYESTER COATINGS
Robert Roper, Summit, N.J., assignor to Esso Research and Engineering Company, a corporation of Delaware
No Drawing. Filed Jan. 4, 1968, Ser. No. 695,563
Int. Cl. C08g 17/02, 17/16, 17/10
U.S. Cl. 260—22
16 Claims

ABSTRACT OF THE DISCLOSURE

A water-soluble coating composition comprising 20–80 wt. percent of a polyester containing alpha, beta-unsaturated dicarboxylic acid residues and hindered dihydroxycarboxylic acid residues, 80–10 wt. percent of a polyester containing beta, gamma-unsaturated ether groups and 0–20 wt. percent of a beta, gamma olefinically unsaturated ether of a polyhydric alcohol containing at least two of said ether groups.

BACKGROUND

It is known that mixtures of polyesters containing alpha, beta-olefinically unsaturated carboxylic acid residues and allyl ether compounds can be used as air-dry coatings resins (British Patent Nos. 887,394 and 974,892). It is also known that if these resins contain a sufficient level of hydrophilic groups such as carboxyl groups or polyethylene glycol residues, they can be dispersed in water to form water-based air-dry coatings (British Patent Nos. 995,271 and 1,007,834). However, these resins have poor dispersering and wetting properties. In addition, the polyesters containing alpha, beta-olefinically unsaturated carboxylic acid residues are difficult to formulate for both good water compatibility and sufficient $\overline{M}_n$ (number average molecular weight) to give fast cures and good mechanical properties—i.e. good flexibility, and hardness. A $\overline{M}_n$ of at least 1200, preferably 1500, is required to provide these desirable coating properties. One type of unsaturated polyester well known in the art is prepared from dibasic acids and dihydric alcohols, giving linear polymer structures with their water-soluble carboxyl groups located at the terminal positions of the polymer molecule. At $\overline{M}_n$ of about 1200, these polyesters have shown poor water-compatibility and also poor wetting properties. In addition, aqueous dispersions tend to have excessively high viscosities. Whereas lower molecular weight polyesters of this type give better compatibility and lower viscosities, they produce coatings of insufficient toughness and flexibility.

SUMMARY

In accordance with the present invention the above difficulties are overcome and coatings are obtained with improved wetting properties and pigment dispersion, improved application properties, improved water compatibility and improved film properties, by providing a composition consisting of 20–80 wt. percent of Component (A), a branched polyester containing alpha, beta-olefinically unsaturated carboxylic acid residues and prepared by reacting a mixture of (a) an alpha, beta-unsaturated dicarboxylic acid,
(b) an aliphatic, cycloaliphatic or aromatic dicarboxylic acid free from alpha, beta-olefinic unsaturation,
(c) a monobasic fatty acid,
(d) a glycol,
(e) a polyol containing at least three hydroxyl groups,
(f) a hindered dihydroxycarboxylic acid, as defined below, and 80–10 wt. percent of Component (B), a polyester with pendant beta, gamma olefinically unsaturated ether groups (identified hereinafter as the "polyester ether"), prepared by reacting 30–70 mole percent of (a) a beta, gamma olefinically unsaturated ether of a polyhydric alcohol containing at least three hydroxyl groups in which at least one OH group is left unetherified, and
(b) 30–50 mole percent of a dicarboxylic acid free from alpha, beta-olefinic unsaturation, the mole ratio of (a) to (b) varying from 2:1 to 1:1.5.

The reaction mixture may also be reacted with (c) 0 to 20 mole percent of a hindered dihydroxycarboxylic acid, and
(d) 0 to 20 mole percent of a monobasic fatty acid.

The composition may also contain 0–20% of Component (C), a beta, gamma olefinically unsaturated ether of a polyhydric alcohol, containing at least two of said ether groups. If Component (C) is absent then Component (B) is present in amounts between 80 and 20 wt. percent.

DESCRIPTION OF PREFERRED EMBODIMENTS

The critical feature of the branched polyester (Component A) is the hindered dihydroxycarboxylic acid which imparts excellent water compatibility to the polyester resin, and at the same time retards premature gelation of the polyester during the reaction process. It contains a neo-carboxyl group, i.e. the carboxyl group is located on a fully substituted saturated carbon atom, as shown in the formula where $R_1$, $R_2$ and $R_3$

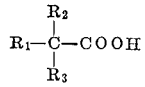

are not hydrogen. The two hydroxy groups should preferably not be located in a gamma or delta position relative to the carboxyl group. Preferably the hydroxyl groups are in form of alpha-methylol groups, i.e.

$$R_2 = R_3 = CH_2OH$$

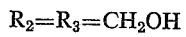

$R_1$ may be an alkyl, cycloalkyl, or aryl groups, but preferably an alkyl group. Preferred examples are alpha, alpha-dimethylol derivatives of propionic, butyric, n-valeric, isovaleric, caprylic, and myristic acid, with a range of carbon atoms from 5 to 16.

Because of the hindered character of the carboxylic group it is relatively unreactive and therefore remains unesterified or substantially unesterified in polyesterifications specified by this invention. Since the dihydroxy carboxylic acid is incorporated into the polyester structure through the hydroxyl groups, it provides unesterified carboxyl groups distributed randomly throughout the polymer molecules. This type of structure results in the excellent water compatibility of these resins. Another advantage of the unreactive carboxyl group is that it does not contribute to crosslinking or gel formation during the polyesterification process, since the dihydroxycarboxylic acid, even though it is trifunctional, behaves as if it were difunctional. Consequently, high conversions are possible in these polyesterifications resulting in high number average molecular weight ($\overline{M}_n$), which are desirable for improved curing and film properties.

In addition to the hindered dihydroxy carboxylic acid, the polyesters also contain polyhydric alcohols with at least three hydroxyl groups, and monobasic fatty acids. Suitable polyhydric alcohols include $C_3$–$C_{30}$ polyhydric alcohols containing 3 to 6 hydroxy groups, such as glycerol, trimethylolethane (TME), trimethylolpropane (TMP), pentaerythritol (PE), dipentaerythritol, sorbitol, and 1,2,6-hexanetriol.

Suitable monobasic fatty acids include aliphatic acids containing 6 to 18 carbon atoms either saturated or unsaturated, such as caproic, caprylic, pelargonic, lauric, myristic, oleic, linoleic, 2-methyl-hexanoic, as well as mixtures of fatty acids commercially available, such as coconut fatty acids, tall oil fatty acids, etc.

Incorporation of the polyhydric alcohol and the fatty acid further improves the water compatibility of the polyester and also imparts excellent wetting and pigment dispersing properties, as well as good application properties such as brushing and leveling to the resin. The branched structure imparted to the polyester by the polyol appears to be responsible for the improved compatibility, while the fatty acids contribute the wetting and pigment dispersing properties.

The advantageous use of the polyol/fatty acid is closely dependent on the presence of the hindered dihydroxycarboxylic acid in the polyester formulation. This is because the dihydroxycarboxylic acid provides water-soluble groups without increasing the crosslink structure of the polyester, thus permitting the incorporation of a triol or higher polyol, within certain limits, without increasing the degree of branchiness to such a level that the polyester gels before high conversions are attained. If water-solubility is provided by trifunctional compounds not containing hindered carboxyl groups, for example, 9,10-dihydroxystearic acid or trimellitic anhydride, then gelation does take place before high polyester conversions are attained, leading to useless products. If, on the other hand, attempts are made to avoid gelation by stopping the polyesterification at low conversions, low $\overline{M}_n$ results and therefore poor curing and film properties are obtained.

In addition to the hindered dihydroxycarboxylic acid, the polyol, and the fatty acid, there must be present also an alpha, beta-olefinically unsaturated dicarboxylic acid, or its anhydride, a dicarboxylic acid free from alpha, beta olefinic unsaturation, and a glycol.

The alpha, beta-unsaturated dicarboxylic acid may be any such acid containing four to eight carbon atoms such as fumaric, maleic, itaconic, chloromaleic, citraconic and mesaconic, or corresponding anhydrides such as maleic or itaconic.

Suitable dicarboxylic acids on anhydrides free from alpha, beta-olefinic unsaturation include aliphatic, cycloaliphatic or aromatic acids containing 4 to 36 carbon atoms such as succinic, glutaric, adipic, pimelic, azelaic, sebacic, dodecanoic, "dimer acid" (dimerized linseed oil fatty acids), phthalic acid, phthalic anhydride, isophthalic, terephthalic, tetrahydrophthalic, endomethylenetetrahydrodicyclopentadienedicarboxylic acid, and cyclohexanedicarboxylic acid. Desirably the dicarboxylic acid free from alpha, beta-olefinic unsaturation is a $C_6$ to $C_{12}$ linear aliphatic dicarboxylic acid.

Suitable glycols include ethylene glycol, 1,2-propylene glycol, neopentyl glycol, 1,3-butylene glycol, 1,4-butylene glycol, 1,4-dimethylolcyclohexane, dipropylene glycol, diethylene glycol, triethylene glycol, and 1,6-hexanediol.

Suitable polyhydric alcohols for preparing the beta, gamma-olefinically unsaturated ethers for synthesis of Component (B) contain from 3 to 30 carbon atoms and include glycerol, trimethylolethane, trimethylolpropane, pentaerythritol, dipentaerythritol, sorbitol, and 1,2,6-hexanetriol. These alcohols may be etherified with allyl or methylallyl alcohol. Thus, typical examples of suitable beta, gamma-unsaturated ethers include trimethylol propane diallyl ether, trimethylol ethane diallyl ether, trimethylol ethan monoallyl ether, pentaerythritol diallyl ether, pentaerythritol triallyl ether, sorbitol tetraallyl ether and their mixtures.

The dicarboxylic acids free from alpha, beta unsaturation, the hindered dihydroxycarboxylic acids, and the monobasic fatty acids which may be reacted with the above compounds to form the polyester ether (Component (B)) include those described above in connection with Component (A).

Suitable polyhydric alcohols for preparing Component (C) contain from 2 to 30 carbon atoms and include glycols, for example, ethylene glycol, propylene glycol, diethylene glycol, neopentyl glycol, 1,3-butylene glycol; or higher polyhydric alcohols such as mentioned above for preparing unsaturated ethers for the synthesis of Component (B). These alcohols may be etherified with allyl or methallyl alcohol to form ether derivatives containing at least two allyl ether or methallyl ether groups. Typical examples of Component (C) are ethylene glycol diallyl ether, neopentyl glycol dimethallyl ether, pentaerythritol tetraallyl ether, and the allyl ethers mentioned above in connection with the polyester ether of Component (B).

The reactants used to prepare the branched polyester (Component (A)) are combined to fulfill the following conditions, where $a$ = number of moles of alpha, beta-unsaturated dicarboxylic acid
$b$ = number of moles of dicarboxylic acid free from alpha, beta olefinic unsaturation
$c$ = number of moles of monobasic acid
$d$ = number of moles of glycol
$e$ = number of moles of triol or higher polyol
$f$ = number of moles of dihydroxycarboxylic acid
$x$ = number of hydroxyl groups of triol or higher polyol.

(1) 
$$\frac{2(d+f)+xe}{2(a+b)+c}$$

ranges from 0.8 to 1.05 preferably from 0.95 to 1.02, or most preferably 1.00. This value represents the number of equivalents hydroxyl groups per carboxyl group excluding the carboxyl groups derived from the hindered carboxyl groups, and should be below 1.05, preferably 1.00 to keep the esterification of hindered carboxyl groups at a minimum.

(2)
$$\frac{2(d+f)}{2(d+f)+xe}$$

ranges from 0.60 to 0.95 preferably 0.65 to 0.85. This value represents the degree of linearity of the polyester molecule.

(3)
$$\frac{c}{(x-2)e}$$

ranges from 0.80 to 1.20, preferably 0.95 to 1.05.

(4)
$$\frac{f}{d+f}$$

ranges from 0.05 to 0.25, and is adjusted so that the required acid number for the polyester is obtained, preferably in the range of 50 to 85. (Acid number=mg. KOH required to neutralize 1 g. polyester sample.)

(5) $a$ Is adjusted to provide the specified unsaturation, ranging from 2.0 to 6.0 meq./g., preferably 2.75 to 4.5 meq./g. For this purpose the formula $$a = \frac{uw}{1000}$$

is applicable, where $w$ = theoretical yield of polyester, in grams, and $u$ = degree of unsaturation, in meq./g.

The above expressions assume no loss of reactants during polyesterification and consequently complete incorporation of all reactants into the reaction product. This can be essentially accomplished by use of a steam-heated fractionating column for removal of water, as shown in the examples. If part of any reactant is lost during the process, an appropriate correction must be made in the quantity charged.

The branched polyester (Component (A)) has the following properties:

$\overline{M}_n$ = 1000–3000, preferably 1500–2500
Unsaturation = 2.0–6.0 meq./g., preferably 2.75–4.5 meq./g.
Unsaturation/mole = 3.0–10.00 eq./mol, preferably 4.0–8.0 eq./mol.
Acid number = 40–150, preferably 50–85 mg. KOH/g.

The polyester ether (Component (B)) has the following properties:

$\overline{M}_n$=500-3000, preferably 1000-2000
Unsaturation=2.5-10 meq./g. preferably 3.5-6.5 meq./g.
Unsaturation/mole=2-10 eq./mol, preferably 3-7 eq./mol.
Acid number=40-150, preferably 50-85 mg. KOH/g.

The polyester ether (Component (B)) need not be prepared from all the four reactants, set forth above, but it must be prepared from the beta, gamma olefinically unsaturated ether of a polyhydric alcohol and the dicarboxylic acid free from alpha, beta olefinic unsaturation. For example, it may be a polyester prepared from the diallyl ether of pentaerythritol and adipic acid. It may also include a hindered dihydroxycarboxylic acid and a monobasic fatty acid, as described above. The beta, gamma olefinically unsaturated ethers of polyhydric alcohol are used in amounts of 30 to 70 mole present; the dicarboxylic acid free from alpha, beta olefinic unsaturation is used in amounts of 30 to 50 mole percent; the hindered dihydroxycarboxylic acid is used in amounts between 0 and 20 mole percent and the monobasic fatty acid is used in amounts of 0 to 20 mole percent. The mole ratio of the beta, gamma unsaturated ether to the dicarboxylic acid is between 2:1 and 1:1.5.

The polyesters (Components (A) and (B)) may be prepared by conventional polyesterification procedures well known in the art. They are preferably prepared under a nitrogen or other inert atmosphere, with agitation, by heating the reactants at a temperature of 180-220° C. with removal of water. It was found that a steam heated packed fractionating column was useful for keeping the more volatile reactants such as the glycols from distilling over with the water. Small amounts of azeotroping solvents such as toluene or xylene may be used to facilitate water removal, but are not necessary.

The branched polyester (Component (A)) is blended with the polyester ether (Component (B)) and optionally with the beta, gamma unsaturated ether (Component (C)). This blend is then diluted with water in the presence of a base, such as ammonia, trimethylamine, triethylamine, morpholine, N-methyl morpholine, ethanolamine, etc. Alkali metal hydroxides and carbonates may also be used, e.g. sodium hydroxide or sodium carbonate. The base is added in an amount about equivalent to the free carboxyl groups, about 0.80 to 1.20 equivalents of base/carboxyl group. Certain water-miscible solvents may be added to improve application properties, compatibility and viscosity, for example, 2-ethoxyethanol, 2-butoxyethanol, dipropylene glycol monomethyl ether, propylene glycol monoethyl ether, and other glycol ethers; alcohols such as isopropanol, t-butanol, isobutanol; and other solvents miscible with both water and Components (A), (B), and (C).

The polyester (Component (A)) is used in amounts of 20 to 80% by weight, preferably 35 to 70%, while the polyester ether (Component (B)) is used in amounts of 80 to 10 wt. percent, preferably 65 to 30 based on the total mixture. The beta, gamma unsaturated ether (Component (C)) may be used in amounts of 0 to 20% by weight. The ratio of equivalents of unsaturation in Components (B) and (C) to equivalents of unsaturation in Component (A) is 85/15 to 30/70, preferably 75/25 to 40/60.

Cobalt is added to these solutions to promote air-drying in amounts of 0.02 to 0.50% cobalt based on the total weight of components (1) and (2). Cobalt is added as cobalt naphthenate, cobalt octoate, cobalt hexanoate, cobalt neodecanoate, cobalt nitrate, or other similar form. Stabilizers may be added to stabilize these compositions against gelation during storage. Preferred stabilizers are oximes such as acetaldoxime, propionaldoxime, butyraldoxime, acetoxime or cyclohexanone oxime.

These coatings may be used in their unpigmented form to give clear finishes, or may be pigmented to give water-soluble, air-dry paints. They may be used for architectural applications such as gloss or semigloss enamels, floor paints, exterior trim paints or house paints. They may also be applied as industrial paints or finishes, e.g. maintenance paints, metal coatings, wood coatings, etc.

The following examples will further illustrate this invention, although the invention is not intended to be limited by these examples. The parts and percentages given are by weight unless otherwise specified.

EXAMPLE 1

A polyester was prepared from 1.50 mole fumaric acid, 0.50 mole adipic acid, 1.30 mole neopentyl glycol (NPG), 0.30 mole alpha, alpha - dimethylolpropionic acid (DMPA), 0.4 mole trimethylolethane (TME), and 0.40 mole distilled coconut fatty acids (acid number 265.4 mg. KOH/g., average molecular weight 211, containing 52% lauric acid, 19% myristic acid, 9% palmitic acid, 6% capric acid, 6% oleic acid, 5% caprylic acid, and 3% $C_{18}$ fatty acids). For this composition, the expressions given above have the following values:

(1) $\quad \dfrac{2(d+f)+xe}{2(a+b)+c}=1.00$ (2) $\quad \dfrac{2(d+f)}{2(d+f)+xe}=0.73$ (3) $\quad \dfrac{c}{(x-2)e}=1.00$ (4) $\quad \dfrac{f}{d+f}=0.188$ The reactants were heated under agitation in a flask equipped with thermometer and a steam heated packed column leading to a Dean-Stark trap and a water-cooled condenser. The mixture was heated to a temperature of 220° C., over a period of 2.33 hours, and then held at that temperature one additional hour. Water of condensation was continuously removed. The polyester (I) recovered was clear and a had a $\overline{M}_n$ (number average molecular weight, by vapor pressure osmometry) of 1730, an unsaturation of 2.90 meq./g., and an acid number of 73 mg. KOH/g. The calculated unsaturation/mole was 5.02 eq./mol.

Another polyester was prepared from 3.90 moles of a mixture of pentaerythritol allyl ethers: 0.55 mole monoether, 2.00 mole diether, 1.35 mole triether; these were mixed with 1.5 mole DMPA, 4.73 mole adipic acid, and 0.55 mole coconut fatty acid (same composition as above). By using a similar procedure as above, the reaction mixture was heated to 200° C. over a period of 2.5 hours, and held at this temperature for 4.7 hours. The polyester (II) recovered was clear, had a $\overline{M}_n$ of 1400 (by vapor pressure osmometry), an unsaturation of 4.32 meq./g., acid number of 72.2 mg. KOH/g. The calculated unsaturation/mole was 6.0 eq./mol. This polyester was treated with 0.25% propionaloxime by weight.

5.55 g. of polyester (I) was mixed with 4.45 g. of polyester (II) and dissolved in a mixture of 1.11 ml. ethylene glycol monobutyl ether, 3.35 ml. of 3.945 N aqueous trimethylamine, and 6.42 ml. water to give a solution containing 50% resin by weight. The solution was treated with 0.23 ml. of a cobalt octoate solution containing 6% cobalt (0.12% cobalt on resin). The solution (III) was clear and had a Gardner viscosity of 75 stokes. The film properties are give in Table I below.

A solution (IV) was prepared containing 4.50 g. polyester (I), 5.50 g. of a duplicate batch of polyester (II), dissolved in 1.11 ml. ethylene glycol monobutyl ether, 3.33 ml. of 3.945 N aqueous trimethylamine, and 6.00 ml. water and was treated with cobalt similarly as above. This solution contained 50% resin by weight. The duplicate batch of polyester (II), hereinafter identified as (II-a), had the following properties: $\overline{M}_n$=1400, unsaturation=4.69 meq./g., and acid number=74.1.

A solution (V) was prepared containing 3.5 g. polyester (I), 6.5 g. polyester (II), 1.11 ml. ethylene glycol monobutyl ether, 3.28 ml. of 3.945 N aqueous trimethylamine and 6.12 ml. water, and was treated with cobalt as above, giving a 50% resin solution by weight. The film properties of both solutions (IV) and (V) are also shown in Table I.

As shown in the table, all films had good flexibilty and hardness. They also exhibited excellent through cure and good clarity.

TABLE I.—FILM PROPERTIES[1] OF COATINGS DESCRIBED IN EXAMPLE 1

| Solution | III | IV | V |
| --- | --- | --- | --- |
| Unsaturation ratio [2] | 55=45 | 65=35 | 74=26 |
| Tackfree time, hours | <21 | <19 | <19 |
| Pencil hardness | 2B–1B | HB–F | HB–F |
| Flexibility, mandrel [3] diameter, inches | 0.16 | 0.19 | 0.23 |

[1] Films cast on glass to give 3-mil wet film, thickness.
[2] Ratio of unsaturation equivalents, polyester II, to unsaturation equivalents, polyester I.
[3] 3-mil wet film cast on cold-rolled steel, tested according to ASTM D 522-60.

EXAMPLE 2

A paint was prepared from 272.3 g. of resin solution (III) (Example 1), 165.0 g. rutile titanium dioxide pigment, and 110.2 g. water. All the pigment was ground with 150 g. of the resin solution+75 g. water, in a ball mill for sixteen hours at 60 r.p.m., using 0.5 inch diameter ceramic balls. The ground portion was then let down with the rest of the resin solution and water.

This paint had an excellent grind (North Standard Value of >7), and excellent color dispersion as tested by addition of 1% of a phthalocyanine blue dispersion. The paint dried tack free in four to five hours. The paint film, after drying, was glossy and tough, and had good through cure.

EXAMPLE 3

A polyester was prepared from 1.38 mole fumaric acid, 0.62 mole adipic acid, 1.525 mole NPG, 0.275 mole DMPA, 0.20 mole TME, and 0.20 mole distilled coconut fatty acids (same composition as in Example 1). For this composition the expressions given above had the following values:

(1) $\dfrac{2(d+f)+xe}{2(a+b)+c}=1.00$ (2) $\dfrac{2(d+f)}{2(d+f)+xe}=0.857$ (3) $\dfrac{c}{(x-2)e}=1.00$ (4) $\dfrac{f}{d+f}=0.153$ The reaction was carried out in the same manner as in Example 1. The polyester (VI) recovered had a $\overline{M}_n$ (by vapor pressure osomometry) of 1600, an unsaturation of 2.97 meq./g. and an acid number 78.2. The calculated unsaturation per mole was 4.75 eq./mole.

4.50 g. of polyester (VI) was mixed with 5.50 g. polyester (II-a) (Example 1) and dissolved in 1.11 ml. ethylene glycol monobutyl ether, 3.43 ml. of 3.945 N aqueous trimethylamine, and 5.90 ml. water, and was treated with 0.23 ml. of a cobalt octoate solution containing 6% cobalt. This solution was clear, and had a Gardner viscosity of 31.5 stokes.

A film cast on glass dried tackfree within nineteen hours and was clear, had excellent through cure, and a pencil hardness of F-H. Conical mandrel test (see Table I, footnote (c)) showed good flexibility: mandrel diameter=0.20 inch.

EXAMPLE 4

This example illustrates the necessity of incorporating polyhydric alcohols with a functionality of 3 or greater to produce a polyester containing alpha, beta-unsaturated ester groups with good water compatibilty. In the following formulation, no triol or higher polyol is used. therefore $$\dfrac{2(d+f)}{2(d+f)+xe}=1.0$$

which is greater than 0.85, the upper limit specified above.

A polyester was prepared from 1.25 mole fumaric acid, 0.75 mole adipic acid, 1.75 mole NPG, 0.25 DMPA. For this composition $$\dfrac{2(d+f)+xe}{2(a+b)+c}=1.00, \text{ and } \dfrac{f}{d+f}=0.125$$

The reaction was carried out as in Example 1, giving a polyester (VII) with $\overline{M}_n=1900$, unsaturation=2.92 meq./g., acid number=71.2, and calculated unsaturation/mole=5.6 eq./mol.

4.5 g. polyester (VII) was mixed with 5.5 g. polyester (II), Example 1, and dissolved in 1.11 ml. ethylene glycol monobutyl ether, 3.23 ml. 3.945 N aqueous trimethylamine, and 6.27 ml. water, and was treated with 0.23 ml. cobalt octoate solution containing 6% cobalt. No clear solution was obtained in this case, but rather a cloudy, nearly opaque dispersion. A film cast on glass was hazy.

EXAMPLE 5

This example illustrates the difficulty of obtaining branched polyesters containing alpha, beta-unsaturated ester groups with high enough molecular weights for good film properties, if no dihydroxycarboxylic acid with a hindered carboxyl group is used. In this case, a fumarate resin was prepared with a tribasic acid, trimellitic anhydride, to provide sufficient carboxyl groups for water solubility.

The polyester was prepared from 3.4 mole maleic anhydride, 1.0 mole fumaric acid, 2.9 mole TME, 3.4 mole decyl alcohol, 2.3 mole trimellitic anhydride, and 1.9 mole tetrahydrofurfuryl alcohol. Using a procedure similar to that in Example 1, a polyester (VIII) was obtained with a $\overline{M}_n$ of 850. The unsaturation was 2.75 meq./g., the acid number 97.1 and the calculated unsaturation/mole 2.3 eq./mol. Repeated attempts to increase conversion in order to obtain higher $\overline{M}_n$ and higher unsaturation/mole resulted in gelled, insoluble product.

Another polyester was prepared from 1.50 mole trimethylolpropane monoallylether, 1.90 mole trimethylolpropane diallylether, 0.63 mole coconut oil, 0.77 mole TME 2.30 mole trimellitic anhydride, and 1.0 mole adipic acid. By means of a setup as described in Example 1, the oil and TME were first heated in the presence of 0.4 g. litharge at 238° C. until a sample of the reaction mixture was soluble in 3 parts by volume of methanol. The rest of the reactants were then added and the reaction continued at 200° C. for 2.25 hours. The polyester recovered (IX) had a $\overline{M}_n$ of 1080, unsaturation of 2.96 meq./g., acid number of 76 mg. KOH/g., and calculated unsaturation/mole of 3.2 eq./mol.

2.30 g. of polyester (VIII) was mixed with 2.14 g. polyester (IX). This mixture was dissolved 1.0 ml. ethylene glycol monobutyl ether, 0.54 ml. 11.45 N aqueous ammonia, and 1.4 ml. water, and treated with 0.09 ml. of a cobalt octoate solution containing 6% cobalt (0.12% cobalt on resin). This solution, when applied as a 3-mil (wet film thickness) film on glass, required about seven days to become print free. After nine days, the through-cure was still poor as judged by extraction with methyl ethyl ketone, which resulted in dissolution of 96% of the film.

The nature of the present invention having thus been fully set forth and examples of the same given, what is claimed as new, useful and unobvious and desired to be secured by Letters Patent is:

1. A coating compositon comprising a mixture of 20–80 weight percent of
   (A) the reaction product of
      (a) an alpha, beta-olefinically unsaturated dicarboxylic acid,
      (b) an aliphatic, cycloaliphatic, or aromatic dicarboxylic acid free from alpha, beta-olefinic unsaturation,
      (c) a monobasic saturated fatty acid,
      (d) a glycol,
      (e) a polyol containing at least three hydroxyl groups, and
      (f) a hindered dihydroxymonocarboxylic acid, the carboxyl group of which is attached to a saturated carbon atom which in turn is attached to groups other than hydrogen,
   in which items (a) to (f) are combined in the following proportions where the letters $a$ to $f$ refer to the number of moles of the corresponding items (a) to (f), and $x$ refers to the number of hydroxyl groups of the polyol:

(1) $\dfrac{2(d+f)+xe}{2(a+b)+c} = 0.8 \text{ to } 1.05$ (2) $\dfrac{2(d+f)}{2(d+f)+xe} = 0.60 \text{ to } 0.95$ (3) $\dfrac{c}{(x-2)e} = 0.80 \text{ to } 1.20$ (4) $\dfrac{f}{d+f} = 0.05 \text{ to } 0.25$ (B) 80–10 weight percent of a polyester with pendant beta, gamma-olefinically unsaturated ether groups prepared by reacting 30–70 mole percent of
      (1) a beta, gamma-olefinically unsaturated ether of a polyhyldric alcohol containing at least three hydroxyl groups in which at least one OH group is left unetherified, and
      (2) 30–50 mole percent of an aliphatic, cycloaliphatic, or aromatic dicarboxylic acid free from alpha, beta-olefinic unsaturation, and
   (C) 0–20 weight percent of a beta, gamma-olefinically unsaturated ether of a polyhydric alcohol, containing at least two of said ether groups.

2. The composition of claim 1 in which Component (B) is formed by reacting 30–70 mole percent of
   (1) a beta, gamma-olefinically unsaturated ether of a polyhydric alcohol containing at least three hydroxyl groups in which at least one OH group is left unetherified, and
   (2) 30–50 mole percent of an aliphatic, cycloaliphatic, or aromatic dicarboxylic acid free from alpha, beta-olefinic unsaturation, and
   (3) 0–20 mole percent of a hindered dihydroxy-monocarboxylic acid, the carboxyl group of which is attached to a saturated carbon atom which in turn is attached to groups other than hydrogen.

3. The composition of claim 1 in which the Component (B) is formed by reacting 30–70 mole percent of
   (1) a beta, gamma-olefinically unsaturated ether of a polyhydric alcohol containing at least three hydroxyl groups in which at least one OH group is left unetherified, and
   (2) 30–50 mole percent of an aliphatic cycloaliphatic, or aromatic dicarboxylic acid free from alpha, beta-olefinic unsaturation, and
   (3) 0 to 20 mole percent each of a hindered dihydroxy monocarboxylic acid, and
   (4) a monobasic fatty acid.

4. The composition of claim 1 where the hindered dihydroxymonocarboxylic acid is a $C_5$ to $C_{16}$ alpha, alpha-dimethylol substituted aliphatic monocarboxylic acid.

5. The coating composition of claim 4 wherein said alpha, beta-olefinically unsaturated acid is selected from the group consisting of acids and acid anhydrides having from 4 to 8 carbon atoms.

6. The coating composition of claim 4 wherein said dicarboxylic acid free from alpha, beta-olefinic unsaturation is selected from the group consisting of aliphatic, cycloaliphatic, and aromatic acids having from 4 to 36 carbon atoms.

7. The coating composition of claim 4 wherein said fatty acid is an aliphatic acid having from 6 to 18 carbon atoms.

8. The coating composition of claim 4 wherein said glycol is selected from the group consisting of ethylene glycol, 1,2-propylene glycol, neopentyl glycol, 1,3-butylene glycol, 1,4-butylene glycol, 1,4-dimethylolcyclohexane, dipropylene glycol, diethylene glycol, triethylene glycol, and 1,6-hexanediol.

9. The coating composition of claim 4 wherein said polyol is a polyhydric alcohol having from 3 to 30 carbon atoms and containing from 3 to 6 hydroxy groups.

10. The coating composition of claim 4 wherein said beta, gamma-unsaturated ether of a polyhydric alcohol of (B) and (C) is synthesized from an alcohol having from 3 to 30 carbon atoms and a compound selected from the group consisting of allyl alcohol and methallyl alcohol.

11. The composition of claim 4 where the alpha, beta-unsaturated dicarboxylic acid is fumaric or maleic, or maleic anhydride, where the dicarboxylic acid free from alpha, beta-olefinic unsaturation is a $C_6$ to $C_{12}$ linear aliphatic dicarboxylic acid, and where the fatty acid is a linear aliphatic acid or a mixture of such acids with an average of 6 to 18 carbon atoms per molecule.

12. The coating composition of claim 11 wherein said glycol is selected from the group consisting of ethylene glycol, 1,2-propylene glycol, neopentyl glycol, 1,3-butylene glycol, 1,4-butylene glycol, 1,4-dimethylolcyclohexane, dipropylene glycol, diethylene glycol, triethylene glycol, and 1,6-hexanediol.

13. The coating composition of claim 12 wherein said polyol is a compound selected from the group consisting of glycerol, trimethylol ethane, trimethylol propane, pentaerythritol, dipentaerythritol, sorbitol, and 1,2,6-hexanetriol.

14. The coating composition of claim 13 wherein said fatty acid is cocoanut fatty acids.

15. The coating composition of claim 1 wherein said mixture contains from 30 to 70 wt. percent (A) and from 65 to 30 wt. percent (B).

16. A coating composition comprising a mixture of 20–80 weight percent of
   (A) the reaction product of
      (a) fumaric acid,
      (b) adipic acid,
      (c) coconut fatty acids,
      (d) neopentylglycol,
      (e) trimethylolethane,
      (f) alpha, alpha-dimethylolpropionic acid
   in which $\dfrac{2(d+f)+xe}{2(a+b)+c} = 0.8 \text{ to } 1.05$ $\dfrac{2(d+f)}{2(d+f)+xe} = 0.60 \text{ to } 0.95$ $\dfrac{c}{(x-2)e} = 0.80 \text{ to } 1.20$ $\dfrac{f}{d+f} = 0.05 \text{ to } 0.25$ where the letters $a$ to $f$ refer to the number of moles of the corresponding items (a) to (f) and $x$ refers to the number of hydroxyl groups of the polyol, and 80–20 weight percent of
   (B) the reaction product of
      (1) 30–70 mole percent of a mixture of the mono, di- and tri-allyl ethers of pentaerythritol,
(2) 30–50 mole percent of adipic acid,
(3) 0 to 20 mole percent of coconut fatty acids, and
(4) 0 to 20 mole percent of alpha, alpha-dimethylolpropionic acid.

References Cited

UNITED STATES PATENTS 3,345,313  10/1967  Ruhf et al. _____ 260—22

OTHER REFERENCES

Chem. Abstracts, vol. 59, No. 4, eight 19, 1963, p. 4,173F.

Chem. Abstracts, vol. 62, No. 4, two 15, 1965, p. 4,219C.

Chem. Abstracts, vol. 63, No. 5, eight 30, 1965, pp. 5,854F–5855A.

Chem. Abstracts, vol. 64, No. 2, one 17, 1966, p. 2,286G.

DONALD E. CZAJA, Primary Examiner

R. W. GRIFFIN, Assistant Examiner

U.S. Cl. X.R.

117—124, 132, 161, 167; 260—29.2, 32.4, 32.6, 33.2, 33.4, 40, 45.9